May 3, 1949. L. H. SHINGLE 2,468,898
TRANSMISSION BELT
Filed Oct. 31, 1945
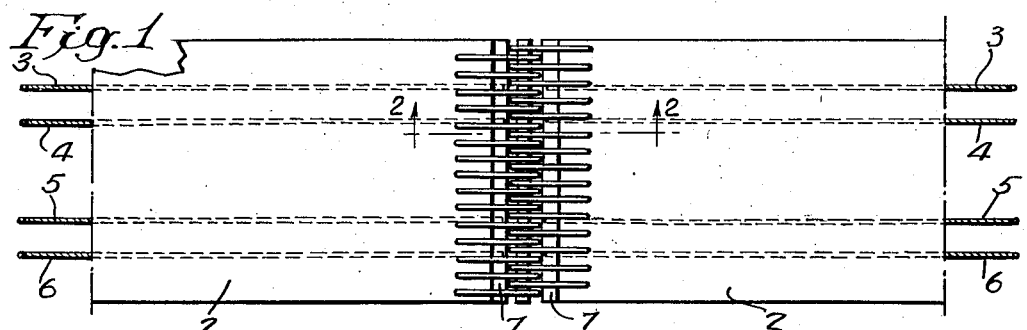
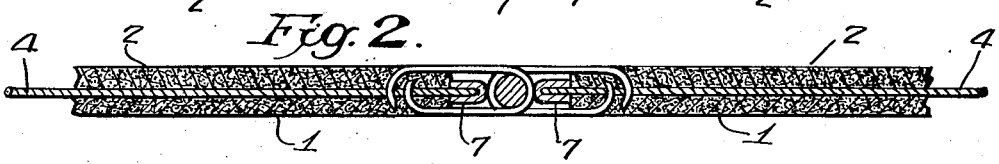
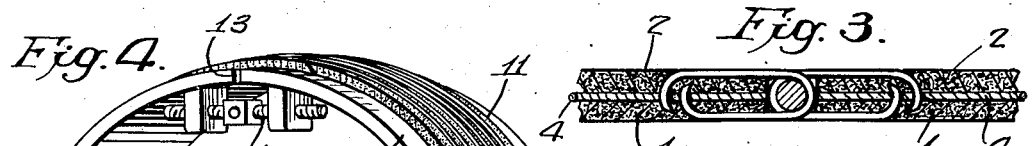
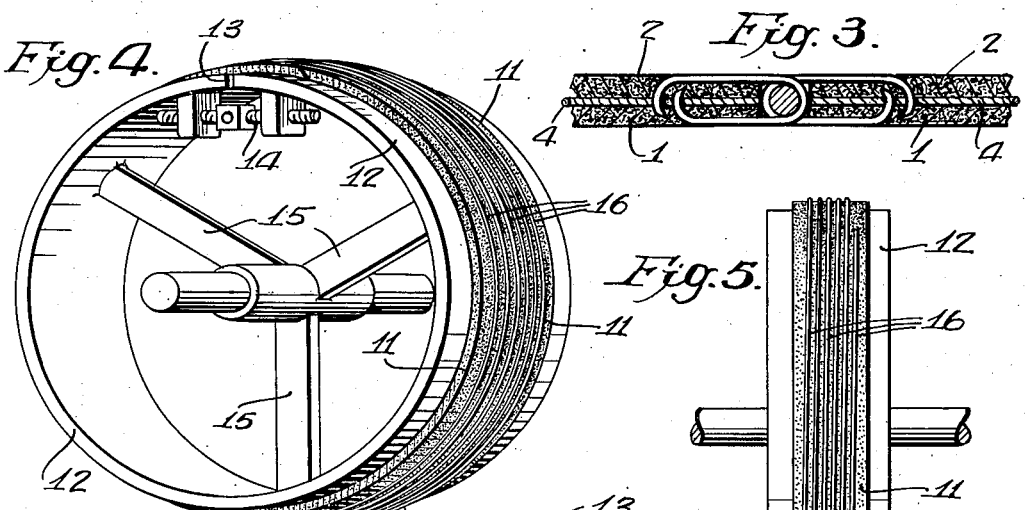
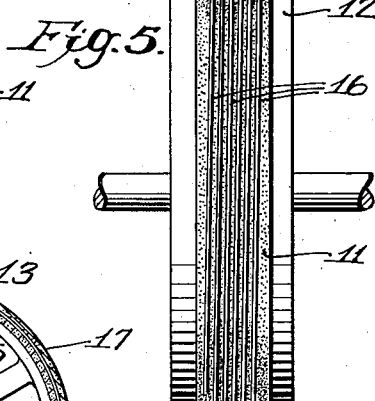
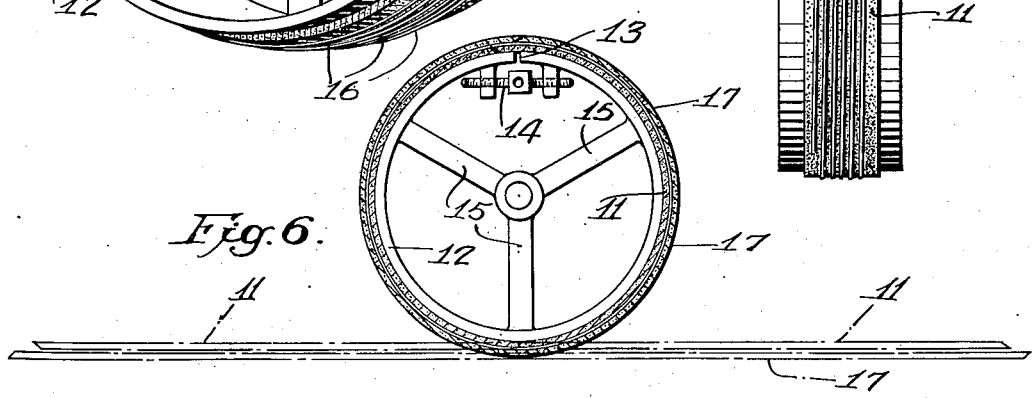
Inventor:—
Lester H. Shingle
by his Attorneys
Howson + Howson Patented May 3, 1949

2,468,898

UNITED STATES PATENT OFFICE 2,468,898

TRANSMISSION BELT

Lester H. Shingle, Philadelphia, Pa.

Application October 31, 1945, Serial No. 625,771

2 Claims. (Cl. 74—232)

A principal object of this invention is to provide a transmission belt composed essentially of leather and having materially improved structural and functional characteristics as compared with the conventional leather belts of the prior art.

More specifically an object of the invention is to provide a transmission belt of the aforesaid type wherein the leather component shall be relieved of all but a minor part of the tensional strains to which the belt is subjected and will function primarily to afford the necessary frictional grip between the belt and the associated pulleys.

Another object of the invention is to provide a transmission belt composed essentially of leather which will be substantially non-stretchable.

The invention further resides in certain structural details hereinafter described and illustrated in the attached drawings wherein:

Fig. 1 is a plan view of a section of transmission belting made in accordance with the invention;

Fig. 2 is a sectional view on the line 2—2, Fig. 1;

Fig. 3 is a fragmentary sectional view illustrating a modification within the scope of the invention;

Fig. 4 is a view in perspective of an element of apparatus for producing endless belts in accordance with the invention;

Fig. 5 is a front view of the structure shown in Fig. 4, and

Fig. 6 is a reduced end view of the said structure.

With reference to Figs. 1 and 2 of the drawings, a belt made in accordance with my invention may comprise inner and outer plies 1 and 2 of leather which may be made in the conventional manner, although the laps uniting the adjoining longitudinal strips of leather composing the individual plies may be reduced to say 2" in length and the ply may be leveled to an exact thickness throughout without detriment to the quality of the finished belt. Departing from the conventional, the belt also comprises a plurality of strands which, in the illustrated embodiment, are 4 in number and are designated respectively by the reference numerals 3, 4, 5, and 6, these strands extending longitudinally of the belt and continuously throughout the linear length thereof between the plies 1 and 2. The said strands may consist of metal or other cord or cable of non-stretchable character, and the free ends thereof preferably project beyond the terminal ends of the leather plies 1 and 2, as illustrated in Fig. 2, and are clamped by transverse clamping bars 7 which securely grip the said projecting ends of the strands and seat against the terminal ends of the leather plies as illustrated. In the present instance the free ends of the belt are shown secured together by a well known commercial type of metallic belt lacer.

In producing the aforedescribed belt, the strands 3, 4, 5, and 6 may be placed upon the inner ply of leather, i. e. the ply which comes in contact with the pulleys, and are tensioned and located on the ply in accordance with the following general formula. The tension of the strands may vary to some extent, it being preferred, however, that the maximum tension on any strand shall not exceed 10 pounds nor that the tension be less than 4 pounds. It is preferred that the tension of the strands 3 and 6, which lie relatively close to the side edges of the belt, be greater than that of the inner strands 4 and 5 for reasons hereinafter set forth. In the embodiment of Fig. 1, the strands are confined to an area of the belt embracing not more than ⅔ of the width of the latter and that the strands be excluded from the longitudinal mid portion of the belt over an area of ⅓ of said width. In other words, the said strands are located in areas along each longitudinal side of the belt, each of which area embraces not more than ⅓ of the total belt width.

After the strands have been located and tensioned as described above, the outer ply 2 of the belt may be applied to the inner layer and cemented to the latter in the conventional manner whereby the tensioned strands are confined between the plies, the tension of the strands being maintained until the cement has thoroughly set. It has been found that in this manner the different tensions of the individual strands will be maintained after release from the tensioning device. It is therefore not essential, although desirable, to utilize the clamping elements 7 as described above, and the strands may be terminated at the ends of the leather, and the ends of the belt then secured together in the conventional manner as illustrated in Fig. 3.

A belt made as described above has certain highly valuable characteristics. It is substantially nonstretchable since the load is carried by the nonstretchable strands. These strands in effect support the leather plies and the latter constitute facing elements of the desired friction characteristics and form no necessary part of the load-carrying structure of the belt. The aforedescribed arrangement of the strands with respect to the leather facing plies, and the fact that the strands nearer the side edges of the belt are under heavier tension than the inner strands, causes the belt to grip the pulley as firmly at the edges as in the central portion of the belt and creates a condition wherein the belt conforms more accurately to the crown of the pulleys so that more uniform and better contact is obtained over the entire surface of the belt. It has been found further that a belt constructed in accordance with the invention as described above has straighter running characteristics than the conventional leather belt due to the fact that the load on the belt is carried by the contained strands rather than solely by the leather. Since the strands are the load carrying members, they will correct any tendency of the belt to run crooked and it is possible to level the belt to an exact thickness without detriment.

It will be understood that the size of the cables or cords which constitute the strands, and the number thereof inserted in the belt may vary widely. In general, however, it is considered sufficient that the size and number of the strands shall be such that the belt will not elongate more than 1% in length during the first five hours of service at a tension of 44 pounds per inch of width.

In Figs. 3, 4, and 5 I have illustrated a means for producing endless belts in accordance with the invention. In this case an inner endless ply of leather 11 may be placed upon a rotary drum 12, said drum being provided with means for circumferential contraction and expansion to receive the said ply and to thereafter hold the ply under light tension against displacement on the cylindrical surface of the drum. In the present instance the drum is split at 13. Means in the form of a screw 14 is provided for expanding and contracting the drum circumference, the small amount of expansion and contraction required for the purpose being readily taken up by flexure of the radial arms 15 which support the cylindrical portion of the drum. After application of the inner ply 11 as described, an endless strand of substantially nonstretchable cable or cord designated in the drawing by the reference numeral 16 may be attached in suitable manner to the ply and then by rotation of the drum, the strand may be laid on the surface of the ply 11 in suitably spaced convolutions and under a required tension which may vary for the said different convolutions in order to obtain an effect of the character described above. In this case the strands nearest the center of the belt may have little or no tension. Subsequently the outer ply 17 of leather may be applied and the two plies cemented together in the conventional manner to thereby confine the strand 16 in obvious manner.

It is apparent that in endless belts of this general character, the strands may be distributed in accordance with the principle embodied in the belt illustrated in Fig. 1, or otherwise, if desired.

It is to be noted that in the belt of Figs. 4, 5, and 6, that the outer ply 17, which is applied after the strands 16 have been wound upon the inner ply 11, is made sufficiently greater in length than the inner ply to embrace the latter and the strands without stretching. This is shown in broken lines in Fig. 6. As a result of this construction the inner ply is substantially free from compression and the outer ply of tension, and the belt exhibits superior running characteristics and durability for this reason. The construction is of particular importance in connection with the strands 16 which tend to accentuate any abnormal condition existing in the leather components affecting the functional characteristics of the belt.

There may be considerable modifications of the aforedescribed constructions without departure from the invention. Where more than two plies of leather are desired, for example, it is preferred to place the load-carrying strand elements between the outer and immediately adjoining plies so that at least two plies of leather will form the friction facing or cushioning between the load-carrying elements and the pulleys.

I claim:

1. A transmission belt comprising a leather facing and a plurality of load-carrying substantially nonstretchable strands affixed to said facing, said strands being confined to an area at each side edge of the facing not exceeding in width ⅓ of the total width of said facing, said strands being tensioned, with the strands nearer the said side edges having a greater tension than those nearer the center line of the belt.

2. A transmission belt comprising a leather facing and a plurality of load-carrying substantially non-stretchable strands affixed to said facing, said strands being tensioned, and strands nearer the side edges of the facing having a greater tension than those nearer the center line of the belt.

LESTER H. SHINGLE.

REFERENCES CITED

The following references are of record in the file of this patent:

UNITED STATES PATENTS

| Number | Name | Date |
| --- | --- | --- |
| 336,990 | Chase | Mar. 2, 1886 |
| 733,393 | Heron | July 14, 1903 |
| 1,192,362 | Young | July 25, 1916 |
| 1,412,309 | Lambert | Apr. 11, 1922 |

FOREIGN PATENTS

| Number | Country | Date |
| --- | --- | --- |
| 18,351 | Great Britain | 1895 |
| 521,117 | Great Britain | May 13, 1940 |